S. E. PETTEE.
Assignor to the UNION PAPER BAG MACHINE COMPANY.
PAPER-BAG MACHINE.
No. 7,275. Reissued Aug. 22, 1876.
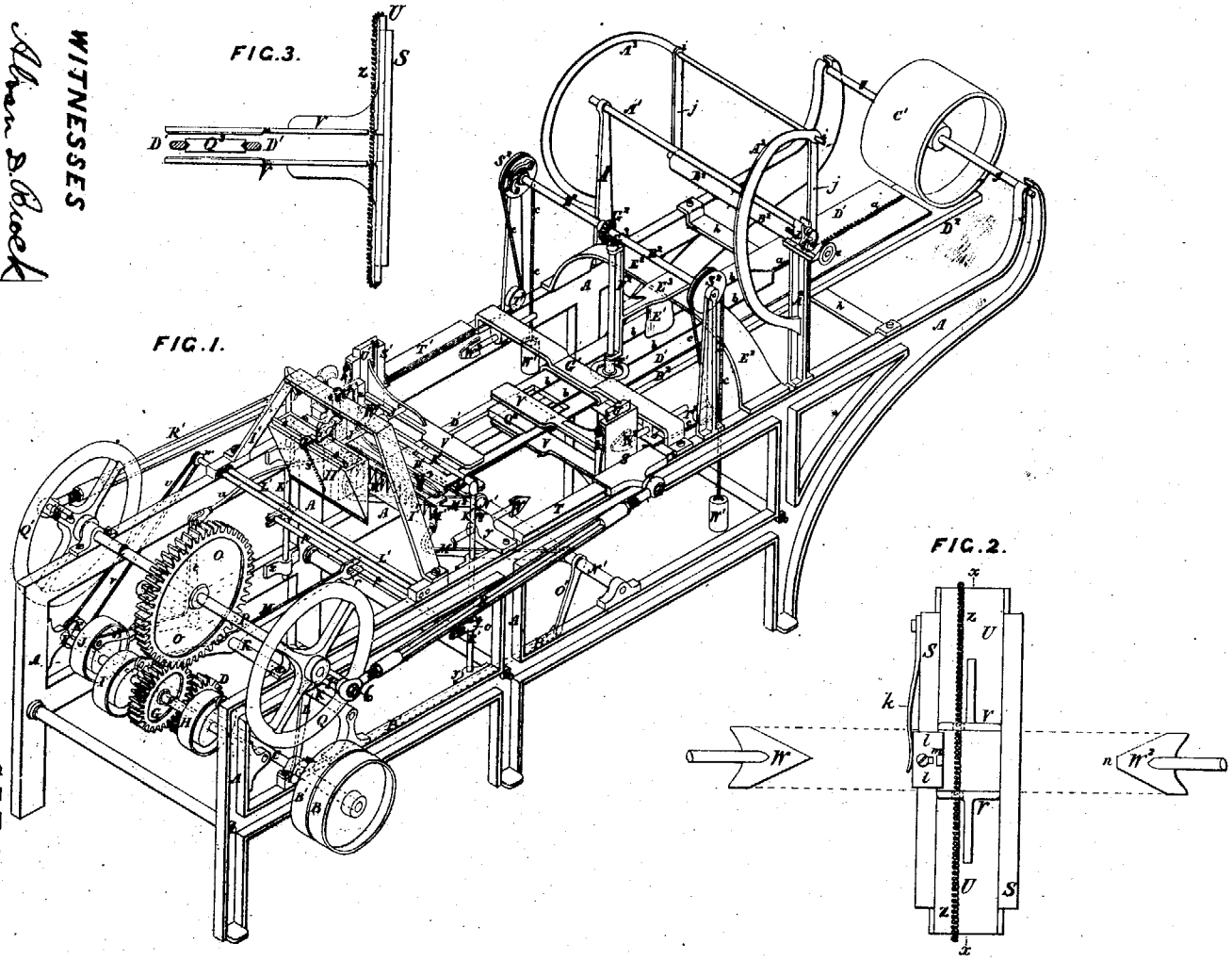
WITNESSES
Alvan S. Brock
John C. Kluber
S. E. Pettee.
INVENTOR
assgs. The Union Paper Bag Machine Co.
by Munson & Philipp, attys.

UNITED STATES PATENT OFFICE

THE UNION PAPER BAG MACHINE COMPANY, OF PHILADELPHIA, PA., ASSIGNEE, BY MESNE ASSIGNMENTS, OF S. E. PETTEE.

IMPROVEMENT IN PAPER-BAG MACHINES.

Specification forming part of Letters Patent No. 28,537, dated May 29, 1860; extended 7 years; reissue No. 7,275, dated August 22, 1876; application filed July 12, 1876.

*To all whom it may concern:*

Be it known that S. E. PETTEE, of the city and county of Philadelphia, State of Pennsylvania, did invent a new and Improved Machine for Making Paper Bags; and the following is declared to be a full, clear, and exact description of the same, reference being had to the accompanying drawing, in which—

Figure 1 represents in isometrical perspective the machine complete. Fig. 2 is a front elevation of one of the slides, with the clamp-stocks and clamps; and Fig. 3 is a vertical section through the line *x x* of Fig. 2.

This invention relates to machinery for forming tubes from a continuous roll of paper and making bags therefrom; and consists in new arrangements for preliminarily bending, creasing, or breaking the paper on the lines of its ultimate folding to form the tubes, and in devices for pasting its edges together to form the tube from which the bags are cut, feeding the tube to the knife, and folding and pasting the closed end of the bag.

To enable others to make and use the improved machine, its construction and operation will now be described, reference being made to the drawings, in which the same part is marked by the same letter of reference wherever it occurs.

The machine is supported in a strong frame, A, of iron, and is driven by power from any suitable prime mover applied to the fast pulley B at the end of the main shaft C. $B^1$ marks the loose pulley on the same shaft. This shaft revolves in journal-boxes attached to the main frame, and on it is placed cog-wheel D, which gears into a similar wheel, G, which may be of the same size and number of teeth, on shaft F above and to one side of it. On the end of the main shaft C is a small pulley, E, which is connected, by cord *v*, to pulley *w*, on the end of the folding-roller L′.

The shaft F is called the cam-shaft, as it carries three grooved cams, H, I, and J, which operate respectively the bent levers attached to the lower shaft K, which are marked L, M, and N. Each of these levers has a pin in the end next the cam, which works in a groove in the side of the cam. The bent lever L, which is called the knife-lever, is connected, by rod P′, to an arm, O′, projecting down from rock-shaft N′, to which the knife-stocks $M^2$, which support the vibrating knife $M^1$, are attached. Thus the lever L, by operating the rock-shaft N′, gives a vibrating up-and-down stroke to the knife $M^1$.

The bent lever M, which is called the "folder-lever," has a fork, *r*, at its inner end, which embraces rod *p*, which is connected, by an adjustable attachment, to frame K′, to which is attached the handle of the folder and paster H′. Hence, when the forked end of the lever M rises or falls it causes the paster and folder H′ to rise or fall also.

The bent lever N, which is called the "dart-lever," is operated by cam J, and is connected at its upper end to rod *u*, the other end of which carries a dart, which operates the stationary clamp $V^2$ by forcing its jaws asunder when it enters between them, and allowing them to close by a spring when it is withdrawn.

The wheel G on shaft F gears into wheel O on crank-shaft P. These wheels are so proportioned that the cam-shaft F shall make two revolutions to each revolution of the crank-shaft P. The shaft P is supported in proper bearings on the top of the main frame. On its ends it carries the fly-wheels Q $Q^1$, each of which has a slotted arm, 5, which receives an adjustable crank-pin, 6, attached to the end of one of the connecting-rods R or $R^1$. These crank-pins can be adjusted to any point of the slot that may be required to alter the throw of the crank. The connecting-rods R $R^1$ are also adjustable in length by the threaded sleeves on their ends working on to right and left screws in the usual way, as shown.

The cranks are always on opposite centers. The ends of the connecting-rods R $R^1$ opposite to those by which they are pivoted to the fly-wheels are pivoted to slides S $S^1$, which have a reciprocating movement on ways T $T^1$, the slide S being at the greatest distance from shaft P when slide $S^1$ is nearest to it. These slides carry, respectively, the clamp-stocks U U′, which slide vertically in a dovetail groove in the inner upright faces of the slides. This arrangement is clearly shown in Fig. 2.

Attached to the sliding stocks U U′ are the clamps V $V^1$, which are of the shape represented, and are covered on their clamping-surfaces with corrugated india-rubber, to give them a good hold upon the paper. The jaws of the clamps are held in contact by a spring, *z*, and are opened by the sharp darts W entering between them. Attached to the slides S S are springs *k*, (see Fig. 2,) which operate the slotted dogs *l*. These dogs, when the jaws of the clamps are far enough apart, are forced by spring *k* between them, and hold them open until they are driven out by coming in contact with the end *n* of blunt darts $W^2$, which strike against the small projecting pieces *m* and force the dogs back, allowing the clamp-jaws to close gradually by sliding down the inclined sides of the darts.

The darts W and $W^2$ are held in sleeves, in which they are adjustable, by means of set-screws, so as to accommodate themselves to the changes that may be made in the throw of the cranks, for the purpose of changing the character of the product of the machine.

The slide of the stationary clamps $V^2$ is attached to the frame A, and these clamps are opened and closed by the moving dart, attached to the end of rod *u*, operated by bent lever N.

Attached to the slides S $S^1$ are cords *c c*, which pass over pulleys $T^2$ and $S^2$, and have weights $W^1$ attached to their ends. The pulleys $S^2$ are hung loosely upon shaft $R^2$, which is supported by standards rising from the main frame. They have pawls on their inner faces, engaging with ratchet-wheels attached to shaft $R^2$, and so arranged that the pulleys and shaft will rotate together when the cords *c* are drawn toward the crank-shaft P, and will have a velocity corresponding to that of the slides to which the cords are attached. The shaft $R^2$ is rotated by the pulleys $S^2$, and carries at its middle a beveled cog-wheel, $G^2$, which gears into a corresponding wheel, $G^3$, on the top of the shaft of the rotary paster F′, and drives that paster with a velocity varying with the speed of the slides S $S^1$. This variation in the speed of the paster is required in order that the velocity of the paster shall correspond with that of the edge of the paper to which it applies the paste. Otherwise the paste would be unevenly distributed along the paper—being scanty in some places, and superabundant in others.

The shaft of the paster F′ is supported by a bracket, $E^3$, projecting from the bridge $E^2$, which is supported at its ends upon the sides of the main frame. The inclined or beveled face of the paster is covered with india-rubber, and the paste is supplied to it by a fountain, (not shown in the drawings,) of the form patented by S. E. PETTEE, November 30, 1858.

From the lever side of the middle of the bridge $E^2$ an arm, $E^1$, projects downward, and is attached to and supports the former $D^1$, around which the paper for making the tubing is to be folded. This former has no other support for its entire length, which extends from the drum C′, at one end of the machine, to the stationary clamps $V^2$, near the other. After passing under the rotary paster F′ it passes through the guide $G^1$, which has a collar to receive it, but which does not touch it at any point, ample space being left on every side for the easy passage of the paper of the tubing between the collar and the former.

The inner end of the former has a large, oblong opening in it, in which the slide $Q^2$ plays longitudinally, (see cross-section, Fig. 3,) said slide having V-shaped grooves in its sides to receive the correspondingly-shaped inner edges of the former, as shown in Fig. 1. The inner end of the former is beveled off to correspond with the cut of the knife $M^1$. On the upper side of the former are grooves, in which run wires *b b*, which are attached to the slide $Q^2$. These wires are attached by an elastic strap or band, *a*, to the outer end of the former. The office of the elastic strap is to draw the slide $Q^2$ toward the guide $G^1$. The upper and under surfaces of the slide $Q^2$ are covered with corrugated india-rubber. Below the former $D^1$ is a board, $D^2$, to support the paper as it passes from the drum C′. It is attached to and supported by the cross-piece *h*, and extends inward as far as the rotating paster F′, where it ceases to be required. The drum C′ is attached to a shaft, *g*, supported in open bearings in the upper ends of curved arms of the main frame. It is approximately of the same width as the former, and consequently of the same width of the bags made by the machine, and it is, for that reason, made easily removable, so that one of a different width may be substituted when the width of the former and bag are to be altered.

$A^2$ marks the standards, which, rising from the main frame, support the paper-shaft $A^1$, on which the roll of paper from which the bags are made is held and rotates. This shaft rests at one end in an adjustable bearing, *d*, which slides on guides *f*, and is adjusted by screw *e*. The object of this arrangement is to adjust the roll of paper laterally at will. From the standards $A^2$ project upward the curved arms $A^3$, to which at *i i* the swinging arms *j j* are pivoted, which carry between them, at their lower ends, the pendent roller $B^2$. The office of this roller is to rest upon the top of the paper as it passes from the roll to the drum C′, and diminish the effect of any changes of velocity in the action of the machine, which might have a tendency to strain or break the paper.

The folder and paster H′ is a box in the shape of half a wedge. One side of it is vertical, and projects below the others in the shape of a knife-edge or striker. The inclined side of the box has a slot-like opening in the bottom, which is controlled by a sliding gate, *s*, kept down by spring 3, and opened, when required, by the operation of lever 1, upon projection 2, lever 1 being operated by contact with the lower end of screw 4 when the box H′ is at its highest point. The screw 4 is supported by the gallows I′. The box H′ is filled with paste, and is kept supplied by a fountain or reservoir, (not shown,) of the usual form. When it rises, so that lever 1 comes in contact with screw 4, a small portion of the paste escapes and covers the knife-edge. When it descends, the knife-edge passes in between the pair of folding-rollers L′, and imparts its paste to any paper that may be introduced between them. The handle J′, of the paster and folder, passes through a sleeve attached to the top rod of frame K′, and is adjusted by means of a set-screw in said sleeve. The frame K′ works vertically in sleeves attached to the sides of the main frame. It has a lower adjustable transverse rod, *p*, which is embraced by the fork of lever M, as before noticed. The ends of the rod *p* are held in forks projecting from sleeves *o*, which are attached to the vertical rods of frame K′ by set-screws, so that the position of rod *p* can be changed at pleasure.

The operation of the machine is as follows: Paper from which the bags are to be made is placed in a large roll on the shaft $A^1$. Its free end is passed under roller $B^2$, over drum C′, and under the former $D^1$, around which the paper is folded, so that its edges come together and lap at about the middle line of the upper side of the former. By passing around the drum, which is approximately of the same width as the former, the paper is prepared to fold kindly in the manner desired, by being broken, bent, or creased, on the lines of its contact with the edge of the drum. But this drum, which thus preliminarily bends or creases, or breaks the tube on the lines of its ultimate folding, might have substituted for it other devices which would operate in the same manner and produce the same result. The overlapping edge of the paper passes over the beveled edge of the paster-wheel F′, and receives a supply of paste when the paper proceeds under and through guide $G^1$, and becomes a tube by the adhesion of its edges. It is here seized by the first pair of clamps V. These clamps, when at the nearest point to $G^1$, begin to close by reason of the dart $W^2$, having removed the dog *l*, which held them open, and as the slide S begins its return motion, the clamps come gradually into contact by sliding on the inclined faces of the dart. This arrangement causes the clamps to close upon the paper while moving in the same direction that they are to draw it, thus avoiding undue strain if not actual rupture.

At the point where the tube of paper is seized by the clamps, the slide $Q^2$ is within the tube, and thus the paper is tightly held between the clamps and the slide $Q^2$, and is drawn toward the knife end of the former without any serious resistance from friction. While it is being thus drawn toward the end of the former by the first pair of clamps V, and the second pair, $V^1$, is moving toward the guide $G^1$, to be ready to seize the paper when it is released by the first pair, the open clamps $V^1$ pass over the closed clamps at each stroke, one jaw being above and the other below them. When the first pair has drawn the tube toward the knife end of the former to the end of the stroke, its jaws are opened by a sharp dart, W, as before described, and it commences its return toward guide $G^1$ for a repetition of the operation. Thus the paper tubing is continuously drawn toward the knife by the clamps, by what may not inaptly be termed hand-over-hand motion. When its end arrives at the folding-rollers L′, it is held to the end of the former by the stationary clamp $V^2$, while the knife $M^1$ rises, and, by an oblique stroke severs from the tube a piece of the proper length for a single bag. When the beveled end of the tube rests upon the folding-rollers L′ the folder and paster H′ descends and forces the end of the bag between the rollers L′, at the same time imparting the required amount of paste to the flap, which, in passing through the rollers, is turned over and pasted, and closes the end of the bag. The bag thus finished passes through the rollers L′, and falls into a suitable receptacle.

This machine, it will be observed, is provided with every adjustment necessary to enable it to make bags of every variety of size within the extremes of its capacity. The former can be replaced by one of a different width, and a corresponding change can be made in the drum. The throw of the crank can be diminished, and the connecting-rods shortened, so as to shorten the stroke of the clamps and lessen the length of the bags. The darts can be adjusted in their sleeves to any change in the stroke of the slides; and the paster and folder H′ is capable of the nicest adaptation to the width of the flap it is required to act upon.

It is contemplated, in some cases, to locate the paster in such a position as to apply the paste to the edge of the paper while in the roll on the paper-shaft. The advantage of thus locating it is that there is great certainty of applying the paste in exactly the right place. However much the paper may move to the right or left in unwinding, the paster will move with it, and no imperfect work will result from this variation in the position of the paper. This is mentioned as a contemplated modification, and not as a better arrangement than that hereinbefore described and shown. The use of more than one former at the same time is also contemplated.

One of the principal advantages of the method of drawing the paper by means of the reciprocating clamps over the use of rollers for the same purpose is that the paper will always work straight through the machine, however uneven the paper may be, whereas in the roller-machines uneven paper is very unmanageable, and, if run through, it makes bad work and much waste of material.

Having thus fully described the invention, what is claimed as of the invention of S. E. PETTEE is—

1. The method of preliminarily creasing the paper, to assist in forming it into a tube, by combining a device, substantially as described, of less width than the web of paper, with a roll of paper, the paper passing from the latter over said device, under tension, on its way to the folding devices.

2. The combination of a rolled web of paper and a device for breaking, bending, or creasing the web longitudinally, with devices for drawing the said web from the roll under tension over the creasing device, all substantially as described.

3. The combination of the paper-roll shaft, the drum C′, for preliminarily creasing, breaking, or bending the tube longitudinally, and the former and the folding devices.

4. The combination of the paster F′ with the web-feeding mechanism, whereby the former positively revolves the latter, so that the web and paster move in unison, all substantially as described.

5. The slide $Q^2$, constructed and operating substantially as described.

6. The folder and paster H′, constructed and operating substantially as described.

7. The clamps $V\ V^1\ V^2$, constructed and operating substantially as described.

8. The reciprocating clamps $V\ V^1$, constructed and operating substantially as described.

In witness whereof THE UNION PAPER BAG MACHINE COMPANY, by EDWIN J. HOWLETT, president, have hereunto set their hand.

EDWIN J. HOWLETT,
*President.*

Witnesses:
H. T. MUNSON,
M. B. PHILIPP.